US008341818B1

(12) United States Patent
Ralph

(10) Patent No.: US 8,341,818 B1
(45) Date of Patent: Jan. 1, 2013

(54) NAIL REMOVAL TOOL

(76) Inventor: Gregory W. Ralph, Fairview, PA (US)

( * ) Notice: Subject to any disclaimer, the term of this patent is extended or adjusted under 35 U.S.C. 154(b) by 545 days.

(21) Appl. No.: 12/387,049

(22) Filed: Apr. 27, 2009

(51) Int. Cl.
*B23P 19/04* (2006.01)
*B23P 19/00* (2006.01)
*B25B 27/14* (2006.01)
*B24C 11/00* (2006.01)
*B66F 15/00* (2006.01)

(52) U.S. Cl. .............. 29/254; 29/275; 29/426.5; 254/19

(58) Field of Classification Search .................... 29/254, 29/275, 426.5, 247; 254/18, 19, 20, 24
See application file for complete search history.

(56) References Cited

U.S. PATENT DOCUMENTS 307,472 A * 11/1884 Lawrence ........................ 254/19
394,756 A * 12/1888 Capewell ........................ 254/19
401,113 A * 4/1889 Baumeister ...................... 254/20
1,873,294 A * 8/1932 Cosgrove ........................ 29/254
4,007,913 A * 2/1977 Aldrich ........................... 254/18
4,078,766 A * 3/1978 Saurwein ........................ 254/18
4,182,016 A * 1/1980 Break ............................. 29/275
4,454,792 A * 6/1984 Burris ............................. 81/463
5,141,205 A * 8/1992 Iwai et al. ....................... 254/18
5,245,737 A * 9/1993 Perea .............................. 29/247
5,433,007 A * 7/1995 Clark et al. ..................... 30/360
5,694,672 A * 12/1997 Perin ............................ 29/426.5
6,145,235 A * 11/2000 Emerson et al. .................. 42/90
6,695,288 B2 * 2/2004 Benitez et al. .................. 254/18
7,140,087 B1 * 11/2006 Giltner ......................... 29/426.1
7,743,683 B2 * 6/2010 Dayton et al. .................... 81/52
2006/0130304 A1 * 6/2006 Roy ................................ 29/254
2007/0270855 A1 * 11/2007 Partin ............................ 606/72

* cited by examiner

*Primary Examiner* — Lee D Wilson
*Assistant Examiner* — Alvin Grant
(74) *Attorney, Agent, or Firm* — Richard K Thomson

(57) ABSTRACT

A nail removal tool in the form of an adapter for attachment to the drive socket of a rotary driver such as a rotary pneumatic impact driver. The adapter includes a drive shaft engagable with the chuck of the pneumatic driver, a cylindrical foot with a slot for receiving the body of a nail and a ramp for engaging under the head and lifting it to dislodge the nail from its embedded location. A coil spring serves as a flexible connection to provide proper presentation of cylindrical bit allowing wedging of the adapter beneath the head of a nail which is reluctant to be removed.

8 Claims, 2 Drawing Sheets

NAIL REMOVAL TOOL

BACKGROUND AND SUMMARY OF THE INVENTION

The present invention is directed to the construction industry. More particularly, the present invention is directed to a nail removal tool in the form of an adapter securable to a rotary power tool, such as a rotary pneumatic impact drive motor.

When re-roofing, one of the most difficult, time-consuming tasks is removing the nails used to secure the old shingles. If these nails are not removed, they can tear through the new shingles and interfere with their proper installation and functionality. In addition, they pose a safety hazard to the installers as they move about the roof. It is among the objects of the present invention to provide an effective, yet inexpensive, adapter to remove the old nails.

The adapter of the present invention comprises a) a drive shaft insertable into a chuck of the rotary power tool, the drive shaft having a diametrically extending drive blade; b) a cylindrical bit having a diametrically extending recess which receives said drive blade of the drive shaft, the cylindrical bit having a foot with a slot for receiving a body portion of a nail, the foot having a ramp extending on at least one side of the slot for engaging beneath a head of the nail; c) connection means attached between the drive shaft and the cylindrical bit to transmit a force from the rotary power tool to the cylindrical bit. Preferably the ramp extends on both sides of the slot.

The flexible connection means comprises a) a coil spring, b) first attachment means securing the coil spring to the drive shaft, and c) second attachment means securing the coil spring to the cylindrical bit. The attachment means further comprises a tab welded to an upper portion of the coil spring, the tab having a hole extending therethrough. A pin extends through the hole in the tab and through a diametrical through-bore in the drive shaft. There is a hole in a protruding end portion of the pin and a cotter pin is fastened therethrough. The second attachment means comprises a peripheral weld securing a lower course of the coil spring to a peripheral portion of the cylindrical bit. The cylindrical bit has an upper portion with a central rotational axis, the slot of the foot being radially offset from the central rotational axis.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
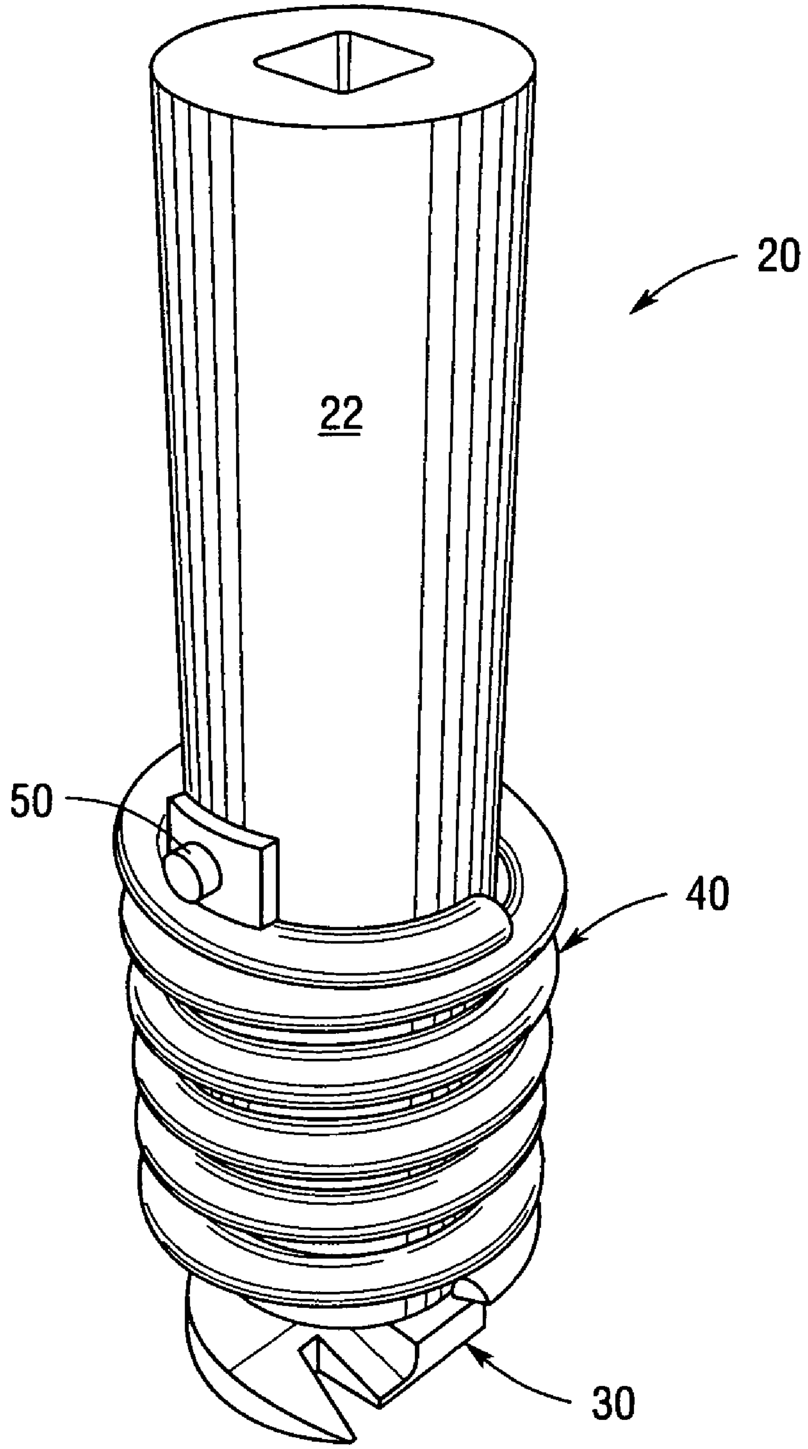
FIG. 1 is a perspective front view of a first embodiment of the nail removal tool of the present invention.
Figure 2:
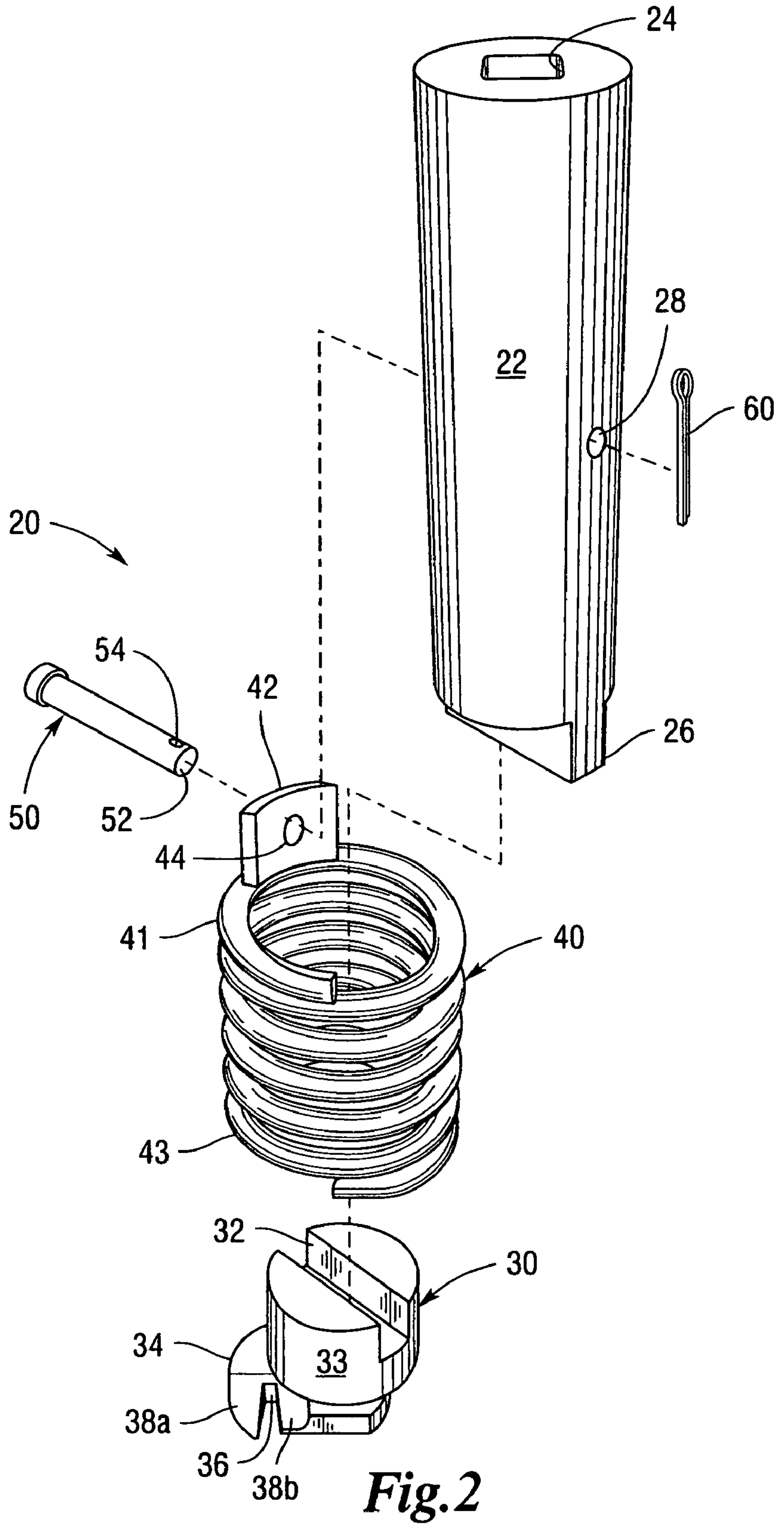
FIG. 2 is an exploded front perspective view of the first embodiment.

A first embodiment of the nail removal tool of the present invention is depicted in FIGS. 1 and 2 generally at 20. As best seen in FIG. 2, nail removal tool 20 comprises an adapter for a rotary power tool such as a rotary pneumatic impact driver and includes a drive shaft 22 engagable with a chuck of the rotary power tool (not shown). Drive shaft 22 has an internal recess 24 depicted here as being square, since that is the normal configuration of the male protrusion which it engages. It will be understood that other shapes are within the scope of the present invention. Drive shaft 22 has a diametrically extending drive blade 26 depicted as a conventional straight blade, although here, again, other shapes are within the scope of this invention.

Cylindrical bit 30 has a diametrically extending recess 32 which receives drive blade 26 drive shaft 22. Cylindrical bit 30 has an upper cylindrical portion 33 with a lower foot 34. Foot 34 has a slot 36 for receiving a body portion of a nail (not shown). Foot 34 has a ramp **38*a* extending on at least one side (and preferably both sides, see 38*b*) of slot 36** for engaging beneath a head of the nail and dislodging it from its hole in the roofing panel.

Flexible connection means in the form of a coil spring 40 is attached between drive shaft 22 and cylindrical bit 30 to cushion the force transmitted by the rotary power tool to cylindrical bit 30. A first attachment means preferably taking the form of tab 42 welded to upper portion 41 of coil spring 40, is used to secure coil spring 40 to drive shaft 22. Tab 42 has hole 44 extending there through which receives a headed pin 50 which further extends through a diametrical through bore 28 in drive shaft 22. Pin 50 has a hole 54 in end 52 which protrudes from through bore 28 and receives cotter pin 60 to retain it in engagement, securing spring 40 to drive shaft 22.

Second attachment means secures coil spring 40 to cylindrical bit 30. Preferably, second attachment means comprises one or more spot welds between the lower course 43 of spring 40 and the exterior periphery of cylindrical bit 30. Cylindrical bit 30 has a central rotational axis A (FIG. 2) and slot 36 in foot 34 is radially offset from axis A. As the rotary power tool with the adapter 20 attached thereto is manipulated to position the mouth of slot 36 adjacent the head of a nail to be removed, as impact air power energizes the bit, ramp surfaces **38*a*, 38*b* will engage beneath the head of the nail, lifting it upwardly. The continued rotation of cylindrical bit 30 by the power tool will hammer the nail from its embedded location and toss it aside. The flexible connection means (coil spring 40) permits cylindrical bit 30 to float relative to the drive shaft 22 for proper receiving position of lower foot 34 necessary for engaging the nail when adapter 20 is moved horizontally over an uneven panel surface or at an angle less than perpendicular to the nail candidate for extraction. Additionally, the spring 40 cushions the force delivered by the impact driver to the cylindrical bit 30 lessening the possibility that adapter 20** will be broken during use.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. An adapter for a rotary power tool for removing nails from a surface, said adapter comprising:

a) a drive shaft engagable with a chuck of the rotary power tool, said drive shaft having a diametrically extending drive blade;

b) a cylindrical bit having a diametrically extending recess which receives said drive blade of said drive shaft, said cylindrical bit having a foot with a slot for receiving a body portion of a nail, said foot having a ramp extending on at least one side of said slot for engaging beneath a head of the nail;

c) flexible connection means attached between said drive shaft and said cylindrical bit permitting an entirety of said cylindrical bit to float relative to said drive shaft when said foot contacts the surface.

2. The adapter of claim 1 wherein said ramp extending on at least one side of said slot for engaging beneath a head of the nail extends on both sides of said slot.

3. The adapter of claim 1 wherein said flexible connection means comprises a) a coil spring, b) first attachment means securing said coil spring to said drive shaft; and c) second attachment means securing said coil spring to said cylindrical bit.

4. The adapter of claim 3 wherein said first attachment means further comprises a tab welded to an upper portion of said coil spring, said tab having a hole extending therethrough.

5. The adapter of claim 4 further wherein said first attachment means comprises a pin extending through said hole in said tab and through a diametrical throughbore in said drive shaft.

6. The adapter of claim 5 wherein said first attachment means further comprises a hole in a protruding end portion of said pin and a cotter pin insertable therethrough.

7. The adapter of claim 6 wherein said second attachment means comprises a peripheral weld securing a lower course of said coil spring to a peripheral portion of said cylindrical bit.

8. The adapter of claim 1 wherein said cylindrical bit comprises an upper portion having a central rotational axis, said slot of said foot being radially offset from said central rotational axis.

* * * * *